United States Patent
Hasegawa (10) Patent No.: US 6,999,303 B2
(45) Date of Patent: Feb. 14, 2006

(54) SOLID ELECTROLYTIC CAPACITOR AND PROCESS FOR ITS FABRICATION

(75) Inventor: Hiroaki Hasegawa, Tokyo (JP)

(73) Assignee: TDK Corporation, Tokyo (JP)

( * ) Notice: Subject to any disclaimer, the term of this patent is extended or adjusted under 35 U.S.C. 154(b) by 22 days.

(21) Appl. No.: 10/774,611

(22) Filed: Feb. 10, 2004

(65) Prior Publication Data

US 2005/0128685 A1 Jun. 16, 2005

(30) Foreign Application Priority Data

Feb. 10, 2003 (JP) .................. 2003-032908

(51) Int. Cl.
*H01G 9/00* (2006.01)

(52) U.S. Cl. .............. 361/523; 361/525; 361/528; 361/529; 361/530; 361/516; 29/25.03

(58) Field of Classification Search ........... 361/523, 361/524, 525, 528, 529, 530, 502, 508, 509, 361/516, 519, 520, 503; 29/25.03
See application file for complete search history.

(56) References Cited

U.S. PATENT DOCUMENTS

| | | | | |
|---|---|---|---|---|
| 5,457,862 A | * | 10/1995 | Sakata et al. | ........... 29/25.03 |
| 5,461,537 A | * | 10/1995 | Kobayashi et al. | ......... 361/525 |
| 6,154,358 A | * | 11/2000 | Fukaumi et al. | ........... 361/523 |
| 6,300,015 B1 | * | 10/2001 | Nishiyama et al. | ......... 429/303 |
| 6,696,138 B1 | * | 2/2004 | Sakai et al. | ................. 428/209 |
| 2003/0087160 A1 | * | 5/2003 | Suzuki et al. | ............... 429/327 |

FOREIGN PATENT DOCUMENTS

| | | |
|---|---|---|
| EP | 1 030 272 A2 | 8/2000 |
| EP | 1 120 726 A1 | 8/2001 |
| JP | A 11-283874 | 10/1999 |
| JP | A 2000-21689 | 1/2000 |
| WO | WO 00/43904 | 7/2000 |

* cited by examiner

*Primary Examiner*—Dean A. Reichard
*Assistant Examiner*—Nguyen T. Ha
(74) *Attorney, Agent, or Firm*—Oliff & Berridge, PLC

(57) ABSTRACT

The solid electrolytic capacitor of the invention is provided with a first electrode layer and a second electrode layer between which are disposed a dielectric layer formed on the surface of the first electrode layer, and a solid electrolyte layer. The solid electrolyte layer is formed adjacent to the dielectric layer, and it is made of a solid electrolyte containing a conjugated polymer compound and a polymer compound having a proton-donating functional group. Repaired sections are formed in the solid electrolytic capacitor as damaged sections generated in the dielectric layer undergo self-repair due to the metal oxidation power or oxidation catalyzing power of the solid electrolyte. It is thereby possible to reduce deterioration with time and sufficiently inhibit defects and short circuits between electrodes.

9 Claims, 8 Drawing Sheets

SOLID ELECTROLYTIC CAPACITOR AND PROCESS FOR ITS FABRICATION

BACKGROUND OF THE INVENTION

1. Field of the Invention

The present invention relates to a solid electrolytic capacitor and to a process for its fabrication.

2. Background Art

Recent years have seen increasingly accelerated digitalization, miniaturization and higher speeds of electronic devices. Electrolytic capacitors are high frequency application-suited electronic parts which are abundantly employed in various types of electronic devices, and hence they are being required to exhibit even higher capacitance and lower impedance during high-frequency operation than in the past, while superior properties such as operational stability, reliability and extended usable life are also greatly desired.

Electrolytic capacitors are generally fabricated by providing a valve metal layer made of aluminum, tantalum or the like, the surface of which is successively laminated with a dielectric layer made of an oxide film formed by anodic oxidation, an electrolyte layer and a conductor layer made of graphite, silver or the like.

Such electrolytic capacitors are largely classified into two types: electrolytic solution capacitors and solid electrolytic capacitors, based on the properties of the electrolyte material. The former type possesses an electrolyte layer comprising a liquid electrolyte (electrolytic solution) as the electrolyte material, while the latter possesses an electrolyte layer comprising a solid electrolyte (complex salt, conductive polymer, etc.) as the electrolyte material. When compared in terms of their properties, the former is intrinsically prone to deterioration with time due to leakage or evaporation (dry-up) of the electrolyte, while the latter is essentially free of such risk.

Because of this advantage, research and development of solid electrolytic capacitors have been actively pursued in recent years, and particularly in consideration of the leakage current value, impedance characteristics and heat resistance, the focus of development and implementation has drastically shifted from capacitors employing manganese dioxide or complex salts to those employing conductive polymers prepared by doping conjugated polymer compounds such as polypyrroles, polythiophenes and polyanilines with electron donor or electron acceptor substances (dopants).

Incidentally, the valve metal layer of an electrolytic capacitor having the general construction described above is usually etched to achieve higher capacitance, and the surface thereof therefore has a fine irregular shape. Consequently, the dielectric layer formed thereover also exhibits the same fine irregular shape. The dielectric layer can suffer serious damage and even loss of function due to natural deterioration when the electrolytic capacitor stands for long periods without a circuit load, or due to sudden temperature changes, electrical shock (by application of overvoltage, reverse voltage or excess ripple current) or physical shock.

When such damage occurs, the electrolytic capacitor exhibits phenomena such as increased leakage current and subsequent short circuiting. It is therefore considered absolutely essential for an electrolytic capacitor to have the property of self-repairing the damaged portions of the dielectric (hereinafter referred to as "self-repair function").

In an electrolytic capacitor employing the aforementioned electrolytic solution, the valve metal which is emergent (exposed) at the damaged sections is in contact with the electrolytic solution. The electrolytic solution contains ionic molecules or compounds, and application of a prescribed rated voltage to the electrolytic capacitor causes oxidation of the valve metal by oxygen produced from the ionic molecules or compounds, thereby regenerating the damaged sections of the dielectric.

In contrast, essentially no ionic migration occurs in a solid electrolytic capacitor. It is therefore difficult to achieve the repair function described above. Emergence of immediately local damaged sections results in formation of current pathways and local buildup of Joule heat by the generated current, which heat converts a portion of the solid electrolyte to a non-conductor and can block the current pathway. In the case of very extensive damage or large damaged regions, however, repair cannot occur and short circuiting results.

It has therefore been attempted to impart a self-repair function to conductive polymer-type solid electrolytic capacitors while maintaining their excellent properties and physical attributes. For example, Japanese Patent Laid-Open Publication No. HEI 11-283874 and Japanese Patent Laid-Open Publication No. 2000-21689 have proposed solid electrolytic capacitors employing both an electrolytic solution and a conductive polymer compound as electrolytes.

SUMMARY OF THE INVENTION

Nevertheless, conventional solid electrolytic capacitors employing both electrolytic solutions and conductive polymer compounds are no different from electrolytic solution-type electrolytic capacitors in the aspect of containing an electrolytic solution in the electrolyte layer, and therefore gradual deterioration of the capacitor with time due to leakage or evaporation of the electrolytic solution is still a problem that cannot be adequately prevented.

It is therefore an object of the present invention, which has been accomplished in light of these circumstances, to provide a solid electrolytic capacitor which can adequately prevent deterioration of devices with time while also satisfactorily avoiding insulation defects and occurrence of short circuits between electrodes, as well as a process for its fabrication.

As a result of a great deal of avid research, the present inventors have completed the present invention upon finding that the aforementioned object can be achieved by using a specific conductive polymer as the material for constructing the solid electrolyte layer in a solid electrolytic capacitor.

Specifically, the solid electrolytic capacitor of the invention is characterized by being provided with a first electrode layer, a dielectric layer formed on the first electrode layer, a second electrode layer opposing to the first electrode layer, and a solid electrolyte layer disposed between the first electrode layer and second electrode layer and adjacent to the dielectric layer and said solid electrolyte layer made of a solid electrolyte containing a conjugated polymer compound and a polymer compound having a proton-donating functional group.

In other words, the solid electrolyte used in the solid electrolytic capacitor forms a solid electrolyte layer adjacent, to a dielectric layer formed on a valve metal layer (first electrode layer), and it comprises a conjugated polymer compound and a polymer compound having a proton-donating functional group. A solid electrolyte obtained by combining a polymer compound having a proton-donating functional group with a conjugated polymer compound exhibits the properties of a conductive polymer, and can therefore be applied to electrolyte layers for solid electrolytic capacitors, in the same manner as conventional conductive polymers.

It is believed that, in a solid electrolytic capacitor employing this type of solid electrolyte, the polymer compound having a proton-donating functional group in the solid electrolyte either functions as an oxidizing species (agent), or else functions as a catalyst for metal oxidizing reaction by the water or oxygen which is inevitably present in the surroundings. However, its function is not limited to this concept.

Consequently, when the oxide film of the dielectric layer is damaged by thermal, physical or chemical shock, the electrolyte layer at the site of damage comes into contact with the valve metal layer and causes oxidation of the valve metal layer by the aforementioned oxidizing or catalytic effect, thereby regenerating the oxide film. This restores and maintains the insulating property of the dielectric layer. As a result, the solid electrolytic capacitor of the invention provided with this type of solid electrolyte exhibits a very remarkable self-repair function compared to conventional solid electrolytic capacitors.

More specifically, the first electrode layer in the solid electrolytic capacitor is preferably a valve metal layer made of a valve metal consisting of aluminum, tantalum, niobium, titanium or zirconium.

The polymer compound having a proton-donating functional group preferably has a sulfonic acid group or phosphoric acid group as the proton-donating functional group. More preferably, it contains a fluoroethylenic polymer, styrene polymer, (meth)acrylic polymer or imide polymer as the molecular frame bearing the proton-donating functional group.

The polymer compound having a proton-donating functional group even more preferably has a perfluoroalkyl ether side chain having a sulfonic acid group. The "molecular frame" according to the invention refers to the portion of the polymer compound other than the proton-donating functional group, and it may be straight-chain or branched.

The conjugated polymer compound is preferably polyaniline, polypyrrole, polythiophene, polyfuran or a derivative thereof.

The solid electrolyte comprises the polymer compound having a proton-donating functional group at 0.01–50 parts by weight, more preferably 0.1–45 parts by weight and even more preferably 0.2–40 parts by weight to 100 parts by weight of the conjugated polymer compound. According to the invention; "parts by weight" refers to the proportion based on weight (same hereunder).

If the content of the polymer compound having a proton-donating functional group is less than 0.01 part by weight the self-repair function will tend to be insufficient, while if it exceeds 50 parts by weight the properties of the solid electrolytic capacitor (capacitance, leakage current value, impedance characteristic, heat resistance, etc.) will tend to be reduced to an inconvenient level.

The solid electrolyte may be produced by a process comprising a preparation step in which the monomer for the conjugated polymer and a solution containing the polymer compound (having a proton-donating functional group) dissolved in a solvent are mixed to prepare a monomer-containing composition, a polymerization step in which the monomer in the monomer-containing composition is polymerized, and a solvent removal step in which the solvent is removed, either during or after the polymerization step.

The process for fabricating the solid electrolytic capacitor according to the invention is a process for efficiently fabricating a solid electrolytic capacitor of the invention, and it is characterized by comprising a first electrode layer forming step in which the surface of a valve metal is etched to form a first electrode layer, a dielectric layer forming step in which the etched section of the first electrode layer is oxidized to form a dielectric layer, a solid electrolyte layer forming step in which a monomer-containing composition, obtained by mixing the monomer for the conjugated polymer compound and a solution of the polymer compound having a proton-donating functional group dissolved in a solvent, is supplied onto the dielectric layer, the monomer in the monomer-containing composition is polymerized and the solvent is removed either during or after polymerization in order to form a solid electrolyte layer, and a second electrode forming step in which a conductive member is laminated on the solid electrolyte layer to form a second electrode layer. Here, the second electrode layer forming step is preferably followed by an additional post-treatment step for aging treatment.

The dielectric layer of the solid electrolytic capacitor of the invention is disposed between the valve metal layer and the solid electrolyte layer, and it possesses repaired sections which are created when at least part, preferably most and more preferably all of the damaged sections, which occur in such a manner as to result in communication between the valve metal layer and the solid electrolyte layer, become filled or covered by an oxide produced by reaction between the valve metal layer and the solid electrolyte of the solid electrolyte layer containing the conjugated polymer compound and the polymer compound having a proton-donating functional group.

In other words, the dielectric is provided on the surface of the valve metal layer in a roughly film-like manner, and it possesses repaired sections which are made of an oxide formed so as to fill or cover at least part, preferably most and more preferably all of the damaged sections which occur in such a manner as to produce communication between the valve metal layer and the solid electrolyte layer made of the solid electrolyte containing the conjugated polymer compound and the polymer compound having a proton-donating functional group.

The solid electrolytic capacitor of the invention may be specified by this dielectric structure. That is, the solid electrolytic capacitor of the invention is provided with a valve metal layer (first electrode layer), a second electrode layer opposing to the first electrode layer, a solid electrolyte layer disposed between the first electrode layer and second electrode layer and made of a solid electrolyte containing a conjugated polymer compound and a polymer compound having a proton-donating functional group, and a dielectric layer disposed between the first electrode layer and the solid electrolyte layer in a roughly film-like manner, and possessing repaired sections which are made of an oxide formed so as to fill or cover at least part of the damaged sections which occur in such a manner as to produce communication between the first electrode layer and the solid electrolyte layer.

DETAILED DESCRIPTION OF THE PREFERRED EMBODIMENTS

Preferred embodiments of the present invention will now be explained in detail with reference to the accompanying drawings. Similar elements will be indicated by like reference numerals and will be explained only once. The top-bottom and left-right positional relationships are based on those shown in the drawings.

Figure 1:
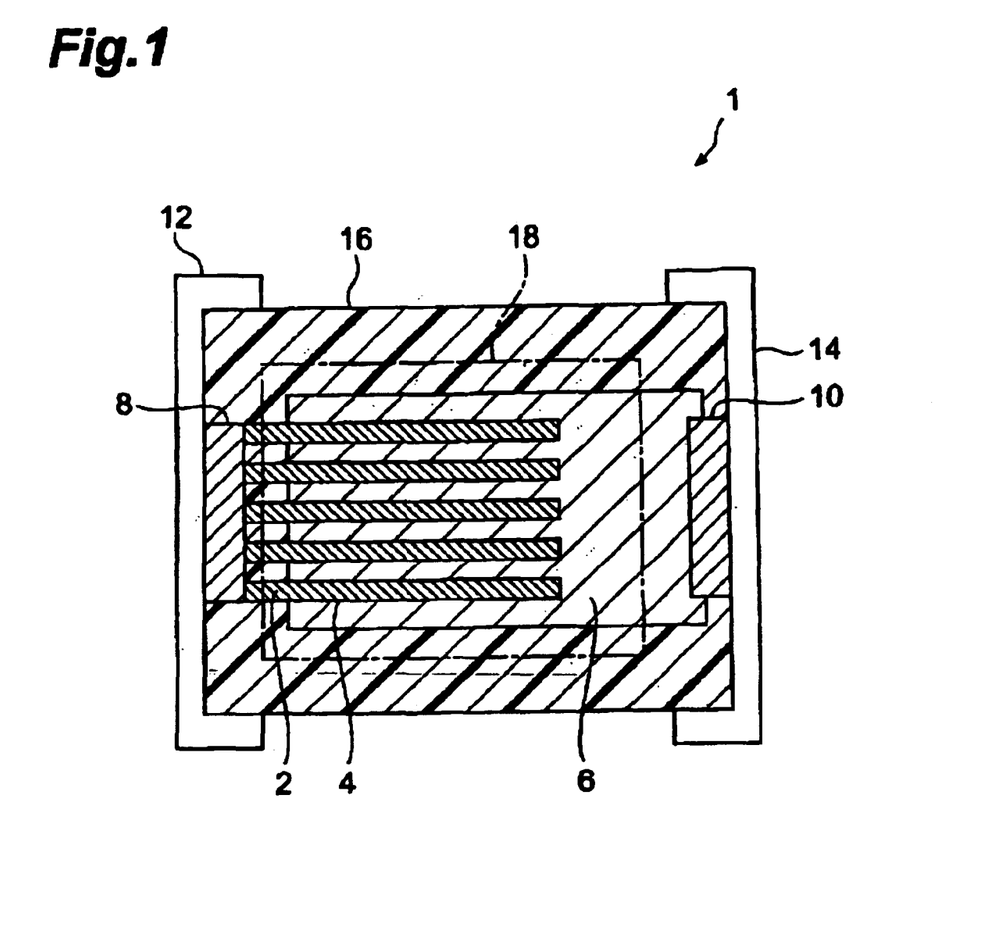
FIG. 1 is a schematic cross-sectional view of an embodiment of the solid electrolytic capacitor of the invention.

FIG. 1 is a schematic cross-sectional view of a preferred embodiment of the solid electrolytic capacitor according to the invention. The solid electrolytic capacitor 1 has a construction wherein a solid electrolytic capacitor element 18 to which anode lead 8 and cathode lead 10 are connected is covered with a resin mold layer 16. An external anode terminal 12 and an external cathode terminal 14 are connected to the anode lead 8 and cathode lead 10, respectively. The solid electrolytic capacitor element 18 also has a dielectric layer 4 provided between an electrode 2 (first electrode layer) and an electrode 6 which are alternately arranged at a fixed spacing.

Figure 2:
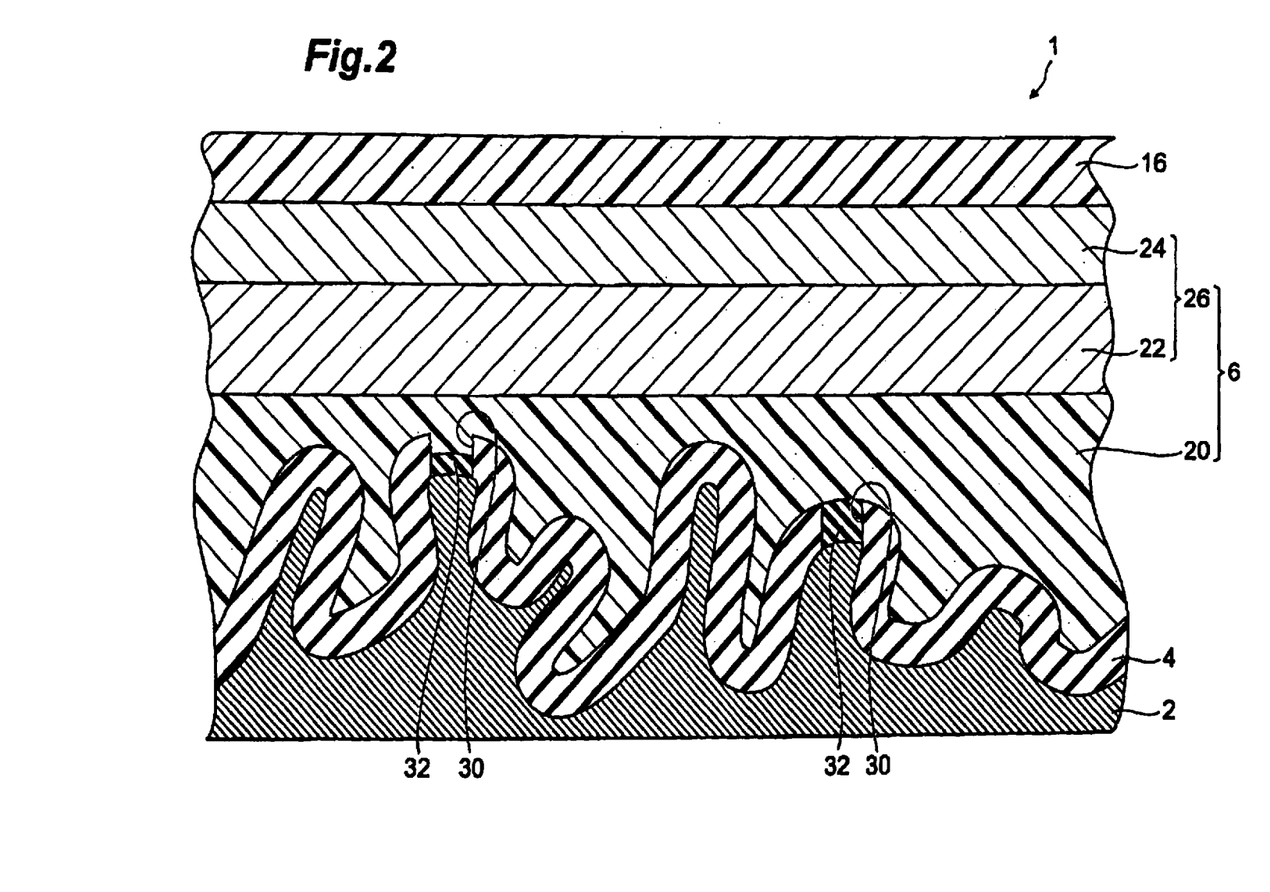
FIG. 2 is a schematic cross-sectional view of the essential parts of the solid electrolytic capacitor 1.

FIG. 2 is a schematic cross-sectional view of the essential parts of the solid electrolytic capacitor 1, showing in detail the state of lamination of the electrode 2, dielectric layer 4, electrode 6 and resin mold layer 16. As seen in this drawing, the solid electrolytic capacitor 1 has a construction wherein the electrode 2, dielectric layer 4, solid electrolyte layer 20 and conductor layers 22,24 are laminated in that order. Thus, the electrode 26 (second electrode layer) is consisted of the conductor layers 22,24, and the electrode 6 is consisted of the solid electrolyte layer 20 and electrode 26.

[Anode]

The electrode 2 functions as the anode in the solid electrolytic capacitor 1. The surface thereof is subjected to etching treatment, whereby the surface area is increased to achieve higher capacitance for the solid electrolytic capacitor 1. The material of the electrode 2 is not particularly restricted so long as it is one commonly used for electrolytic capacitors and as examples there may be mentioned "valve metals" such as aluminum, tantalum, niobium, titanium, hafnium, zirconium, zinc, tungsten, bismuth, antimony and the like. Aluminum and tantalum are relatively preferred among these. The thickness of the electrode 2 is preferred to be about 1–500 $\mu$m in most cases.

[Dielectric Layer]

The dielectric layer 4 is formed along the irregular surface of the electrode 2 in a manner covering the surface. The dielectric layer 4 is made of a metal oxide film (an aluminum oxide film if the electrode 2 is aluminum), usually with an electrical insulating property, and it can be easily formed by oxidation of the surface layer portion of the electrode 2 by a prescribed method. The thickness of the dielectric layer 4 will be 5 nm to 1 $\mu$m in most cases.

Thus, the dielectric layer 4 is formed of an ultrathin layer and is therefore susceptible to damage such as cracking, depletion or loss due to thermal or physical insults either during oxidation treatment of the electrode 2 or after completion of the solid electrolytic capacitor 1 or during its use. When such cracks and other damaged sections propagate, damaged sections 30 may be produced in parts and result in communication between the electrode 2 and the solid electrolyte layer 20. When this, happens, insulation between them is impaired and short circuiting can result in some cases. In contrast, the damaged sections 30 according to the present invention become filled or covered with repaired sections 32 made of the oxide of the valve metal in the electrode 2. Repaired sections 32 are thus formed in the dielectric layer 4.

[Cathode]

The solid electrolyte layer 20 of the cathode 6 is formed along the dielectric layer 4 on the fine irregular surface of the roughened (etched) electrode 2, in a manner filling in the crevices. The thickness of the solid electrolyte layer 20 is preferably a thickness which allows coverage of the irregular surface, and for example, it is preferably about 1–100 $\mu$m. The solid electrolyte of the solid electrolyte layer 20 comprises a conjugated polymer compound and a polymer compound having a proton-donating functional group, and it exhibits the properties of a conductive polymer.

As conjugated polymer compounds there may be used polymer compounds commonly employed as conductive polymers, and for example, there may be used polyanilines, polypyrroles, polythiophenes, polyfurans and their derivatives. Specifically, polyethylenedioxythiophene is particularly preferred. Such compounds may be used alone or in combinations of two or more.

As polymer compounds having proton-donating functional groups there are preferred those having the character of "proton-conducting polymers", which allow free movement of protons.

The proton-donating functional group is a functional group with the ability to donate a proton, and examples of such functional groups include sulfonic acid groups, phosphoric acid groups, carboxyl groups and the like. The relatively strongly acidic groups of sulfonic acid and phosphoric acid are preferred among these.

Examples of the molecular frame to which the proton-donating functional group is bonded include fluoroethylene polymers such as polytetrafluoroethylene, styrene polymers such as polystyrene, (meth)acrylic polymers such as poly (meth)acrylic acid or poly(meth)acrylic acid esters, and imide polymers such as polyimides and the like.

As polymer compounds having the aforementioned proton-donating functional groups and molecular frames there are preferred sulfonic acid group-bonded fluoroethylene polymers, styrene polymers, (meth)acrylic polymers or imide polymers, and phosphoric acid group-bonded (meth) acrylic polymers.

Among these polymer compounds having proton-donating functional groups, those having sulfonic acid group-containing perfluoroalkyl ether side chains are more preferred, and fluoroethylene polymers having sulfonic acid group-containing perfluoroalkyl ether side chains are especially preferred. As such fluoroethylene polymers there are preferred copolymers whose monomer units are fluoroethylene and tetrafluoroethylene having terminal sulfonic acid group-containing perfluoroalkyl ether side chains, of which there may be mentioned, for example, compounds having the repeating unit represented by the following formula (1).

[Chemical Formula 1]

(1)

In formula (1), p is an integer of generally 3–20 and preferably 5–15, q is an integer of generally 1–1000 and preferably 1–500, m is an integer of generally 1–5 and preferably 1–3, and n is an integer of generally 1–5 and preferably 1–3.

The content of the polymer compound having a proton-donating functional group is preferably 0.01–50 parts by weight, more preferably 0.1–45 parts by weight and even more preferably 0.2–40 parts by weight with respect to 100 parts by weight of the conjugated polymer compound of the solid electrolyte. The content referred to here is based on the amount charged for production of the solid electrolyte. If the content is less than 0.01 part by weight the self-repair function may be insufficient. On the other hand, if it exceeds 50 parts by weight the properties of the solid electrolytic capacitor (capacitance, leakage current value, impedance characteristic, heat resistance, etc.) may be inconveniently reduced.

In addition to the aforementioned polymer compound having a proton-donating functional group, the solid electrolyte may also contain added sulfonic acid-based compounds such as sulfosalicylic acid, phosphoric acid ester compounds such as urea phosphate and mono-n-butoxyethyl phosphate and carboxylic acid compounds such as maleic acid, benzoic acid, p-nitrobenzoic acid, phthalic acid, hydroxycarboxylic acid and the like. Addition of such compounds can provide an advantage of an enhanced self-repair function.

The cathode 6 is consisted of the aforementioned solid electrolyte layer 20 and an electrode 26 formed thereover. The materials used for the conductor layers 22,24 of the electrode 26 may be carbon, metals or the like, for example, with carbon as the conductor layer 22 and silver as the conductor layer 24. The electrode 26 is not limited to a two-layer structure of the conductor layers 22,24 and may optionally have a structure of three or more layers.

Figure 3:
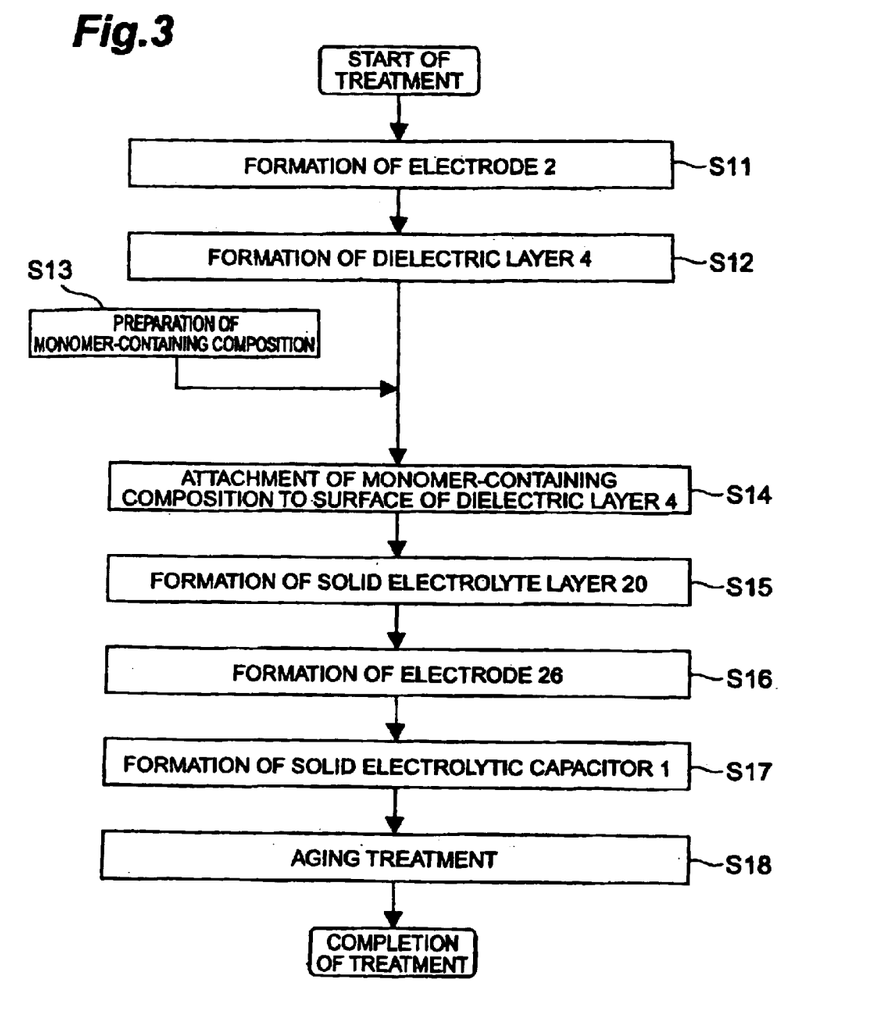
FIG. 3 is a flow chart for a procedure for fabrication of a solid electrolytic capacitor of the invention.

A process for fabrication of a solid electrolytic capacitor 1 having the structure described above will now be explained with reference to FIG. 3. FIG. 3 is a flow chart for the procedure for fabrication of a solid electrolytic capacitor of the invention.

First, the surface of the valve metal (first electrode layer member) is subjected to chemical or electrochemical etching to form an electrode 2 (Step S11; first electrode layer forming step). The surface of the electrode 2 is then subjected to anodic oxidation to produce an oxide film for formation of the dielectric layer 4 (Step S12; dielectric layer forming step).

Specifically, the anodic oxidation may be carried out by immersing the electrode 2 in a chemical solution to render the electrode 2 a positive electrode, and then applying a constant voltage. The applied voltage may be set as appropriate depending on the thickness of the oxide film to be formed, but for most cases it will be a voltage of from about several volts to several hundred volts. The chemical solution used is preferably a buffer solution of ammonium borate, ammonium phosphate, an organic acid ammonium salt or the like. An aqueous solution of the organic acid ammonium salt ammonium adipate is preferred for use.

In parallel with Step S11 or Step S12, a monomer-containing composition is prepared by combining the monomer of the aforementioned conjugated polymer compound with a solution of the aforementioned polymer compound having a proton-donating functional group dissolved in a solvent (Step S13). The solvent for the latter component is not particularly restricted so long as it can dissolve the polymer compound having a proton-donating functional group, but from the viewpoint of efficiently promoting the polymerization reaction described hereunder, it is preferably a solvent with excellent compatibility with the conjugated polymer compound. Such solvents are preferably polar solvents, with ethanol being especially preferred. Such solvents may be used alone or in combinations of two or more.

Next, the electrode 2 having the dielectric layer 4 formed on its surface is immersed in the aforementioned monomer-containing composition, or optionally the monomer-containing composition is applied onto the electrode 2, to attach the monomer-containing composition onto the dielectric layer 4 (Step S14). The monomer in the monomer-containing composition attached to the dielectric layer 4 is then polymerized by chemical oxidation polymerization, for example, to form a solid electrolyte layer 20 on the dielectric layer 4 (Step S15; solid electrolyte layer forming step).

The chemical oxidation polymerization may be carried out by contacting an oxidizing agent solution, obtained by dissolving an oxidizing agent in a solvent such as water, with the electrode 2 on which the monomer-containing composition is attached. The method of contacting these may be a method of immersing the electrode 2 in the oxidizing agent solution or a method of coating the electrode 2 with the oxidizing agent solution.

Examples of oxidizing agents to be used for the polymerization include halogens such as iodine, bromine and the like, metal halides such as silicon pentafluoride, protic acids such as sulfuric acid, oxygen compounds such as sulfur trioxide, sulfuric acid salts such as cerium sulfate, persulfuric acid salts such as sodium persulfate, peroxides such as hydrogen peroxide and iron salts such as iron paratoluate.

If the solvent in the monomer-containing composition evaporates during the polymerization reaction and dissipates out of the system, there is no need for a separate procedure to remove the solvent, but for solvents which do not evaporate during the polymerization reaction, removal of the solvent (solvent removal step) is preferably carried out before or after Step S15 as necessary.

Next, the conductive member (second electrode layer member) is laminated on the solid electrolyte layer 20 to form the electrode 26 (Step S16; second electrode layer forming step). The lamination may be accomplished, for example, by coating the solid electrolyte layer 20 with a paste of the conductive member to form the conductive layer 22, and then further coating thereover a paste of a different conductive member to form the conductive layer 24. As a specific example, coating of the solid electrolyte layer 20 with a carbon paste may be followed by coating with a silver paste.

After forming the solid electrolytic capacitor element 18 in this manner, an anode lead 8 and cathode lead 10 are connected to the electrode. Next, the entire solid electrolytic capacitor element 18 is covered with a resin, mold layer 16 in such a manner that a portion of each lead is exposed outward, and an external anode terminal 12 and external cathode terminal 14 are connected to the anode lead 8 and cathode lead 10, respectively, to obtain a solid electrolytic capacitor 1 (Step S17).

Upon obtaining the solid electrolytic capacitor 1, it is preferably further subjected to aging treatment (Step S18; post-treatment step). The aging treatment may be carried out by applying a constant voltage to the external anode terminal 12 and external cathode terminal 14 of the solid electrolytic capacitor 1, whereby anodic oxidation of the electrode 2 occurs again so that the aforementioned repaired sections 32 are formed in the damaged sections 30 of the dielectric layer 4 which are produced during fabrication of the solid electrolytic capacitor 1.

It is believed that the repaired sections 32 are formed because the solid electrolyte of the solid electrolyte layer 20 has an excellent property of promoting oxidation reaction of the metal composing the electrode 2. The polymer compound having a proton-donating functional group which is present in the solid electrolyte has the ability to oxidize metals as mentioned above, while it is also thought that it acts as a catalyst for oxidation of metals by water or oxygen inevitably present in the surroundings.

Formation of damaged sections 30 results in contact between the electrode 2 and the solid electrolyte layer 20 which exhibits this effect. Presumably, therefore, oxides are rapidly formed to fill or cover the damaged sections 30 during aging or self-repair, thereby creating the repaired sections 32. Repair can thus be efficiently performed even when defects in the dielectric layer 4 are produced during the aging treatment of Step S18.

Regardless of whether or not aging treatment is carried out, damage will occur in the dielectric layer 4 during use of the solid electrolytic capacitor 1, as mentioned above, leading to an inconvenient increase in leakage current. In such cases as well, the metal oxidation power or oxidation catalyzing power of the solid electrolyte will result in self-repair of damaged sections 30 in the dielectric layer 4. Consequently, a solid electrolytic capacitor 1 constructed in the manner described above can prevent deterioration of the element with time to markedly extend the usable life of the device, while also increasing its reliability.

Although this embodiment was explained in regard to the structure and fabrication process of a chip-type solid electrolytic capacitor 1 having the structure shown in FIG. 1, the solid electrolytic capacitor of the invention is not limited to this embodiment, and may have either a single layer structure such as shown in FIG. 2, or optionally, it may be a wound solid electrolytic capacitor prepared by winding such a layer structure.

EXAMPLES

The present invention will now be explained in greater detail through the following examples, with the understanding that they are in no way limitative on the invention.

[Fabrication of Solid Electrolytic Capacitor]

Example 1

An etched aluminum foil (15 mm×15 mm) was prepared as the electrode 2 and was immersed in an aqueous ammonium adipate solution for anodic oxidation with an applied voltage of 23 V, to form an aluminum oxide film as a dielectric layer 4 on the surface layer. Next, 0.5 g of a solution of Nafion™ SE-20192 (DuPont Corp.) was added as a polymer compound having a proton-donating functional group to a mixture of 16.5 mL of ethanol solution and 13.5 mL of distilled water, and then 0.56 g of 3,4-ethylenedioxythiophene and 3.2 g of sodium alkylnaphthalenesulfonate were added to prepare a monomer-containing composition solution. The aluminum oxide film-formed electrode 2 was immersed in this solution to attach the monomer-containing composition thereover.

The monomer-containing composition-attached electrode 2 was then immersed in an oxidizing agent solution obtained by dissolving 1.2 g of cerium sulfate in 20 mL of distilled water for polymerization of the 3,4-ethylenedioxythiophene in the monomer-containing composition, and this was followed by washing with water to remove the unreacted oxidizing agent and excess acid.

This series of steps (immersion in monomer-containing composition solution, immersion in oxidizing agent solution and water washing) was carried out ten times on the same electrode 2 to form a 5 μm-thick solid electrolyte layer 20 on the dielectric layer 4. There were successively laminated a 10 μm-thick carbon layer as the conductive layer 22 and a 20 μm-thick silver paste layer as the conductive layer 24 on the solid electrolyte layer 20. Respective electrode leads were then drawn from the electrode 2 and conductive layer 24 and the entire perimeter was provided with an exterior mold coating by an exterior coating epoxy resin material to obtain a solid electrolytic capacitor 1. The Nafion content in the solid electrolyte layer 20 was approximately 15 wt %.

Example 2

A solid electrolytic capacitor 1 was obtained in the same manner as Example 1, except that Nafion was added in an amount of 1.0 g. The Nafion content in the solid electrolyte layer 20 was approximately 32 wt %.

Comparative Example 1

A solid electrolytic capacitor was obtained in the same manner as Example 0.1, except that no Nafion was added.

[Aging Treatment]

Figure 4:
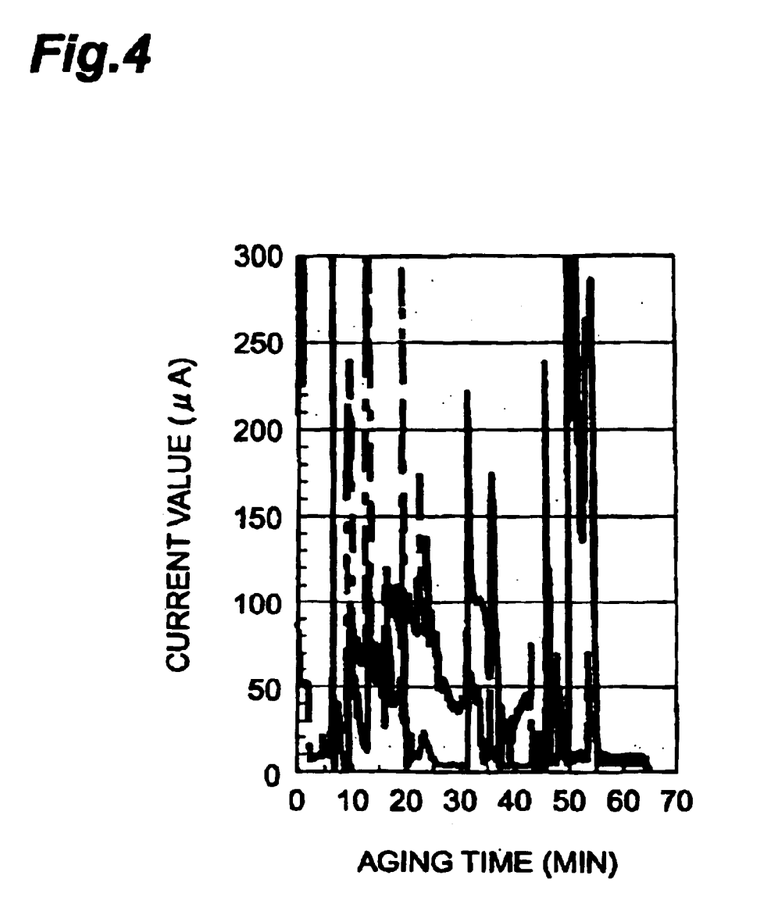
FIG. 4 is a graph showing change in leakage current value with respect to aging treatment time for the solid electrolytic capacitor of Comparative Example 1.
Figure 5:
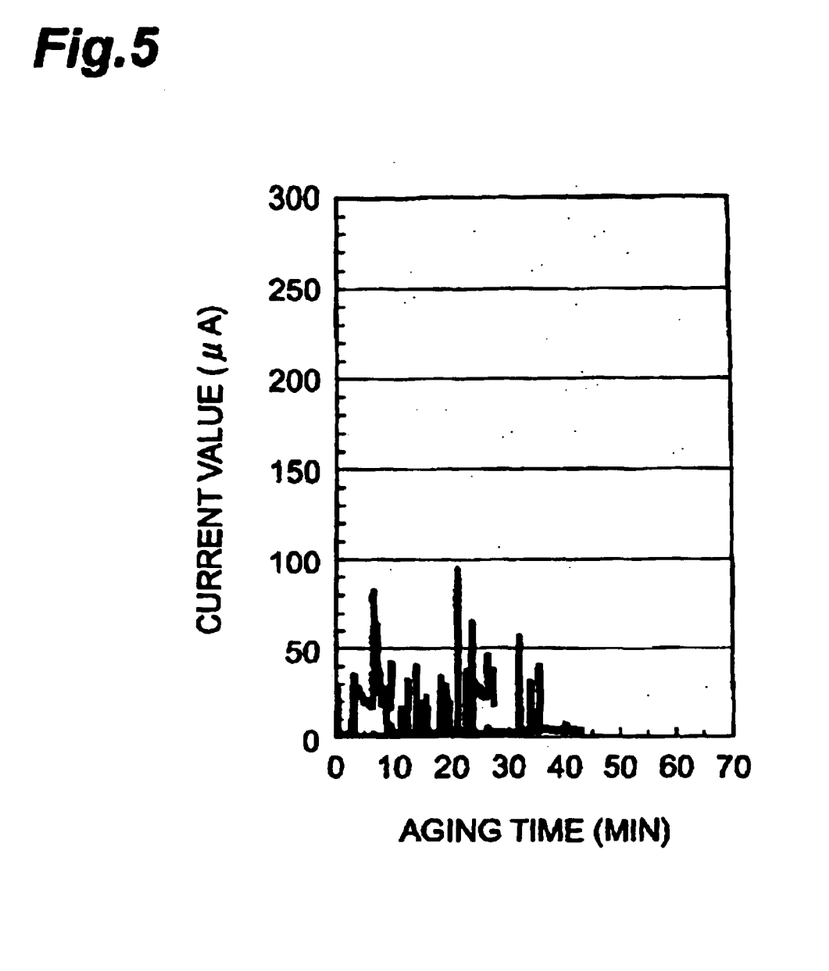
FIG. 5 is a graph showing change in leakage current value with respect to aging treatment time for the solid electrolytic capacitor of Example 1.
Figure 6:
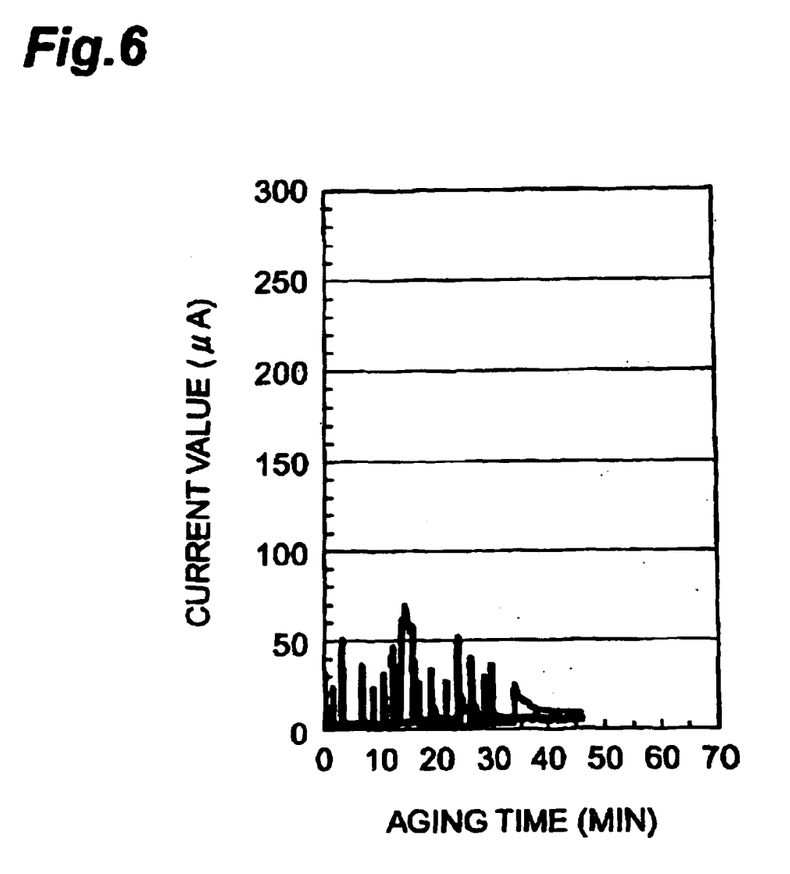
FIG. 6 is a graph showing change in leakage current value with respect to aging treatment time for the solid electrolytic capacitor of Example 2.

The solid electrolytic capacitors of Examples 1 and 2, and Comparative Example 1 were subjected to aging treatment by application of a voltage in a pressure cooker vessel in the presence of steam, and the leakage current values during treatment were measured. FIG. 4 is a graph showing the results obtained for the solid electrolytic capacitor of Comparative Example 1, and FIGS. 5 and 6 are graphs showing the results obtained for the solid electrolytic capacitors 1 of Examples 1 and 2. The graph curves in FIGS. 4, 5 and 6 are the results obtained for multiple runs of each experiment.

FIGS. 5 and 6 confirmed that the solid electrolytic capacitors 1 of the invention, which contained Nafion as a polymer compound having a proton-donating functional group in the solid electrolyte layer 20, tended to exhibit a rapid reduction in the leakage current value with aging treatment. This indicated that solid electrolytic capacitors 1 exhibited an excellent repair function for the dielectric layer 4 which has damage produced during production of the solid electrolytic capacitors 1.

FIG. 4, in contrast, demonstrates that the conventional solid electrolytic capacitor containing no Nafion exhibited no reduction in the aging-induced leakage current value with increasing aging treatment time, indicating difficult repair of the dielectric layer.

[Self-Repair]

Figure 7:
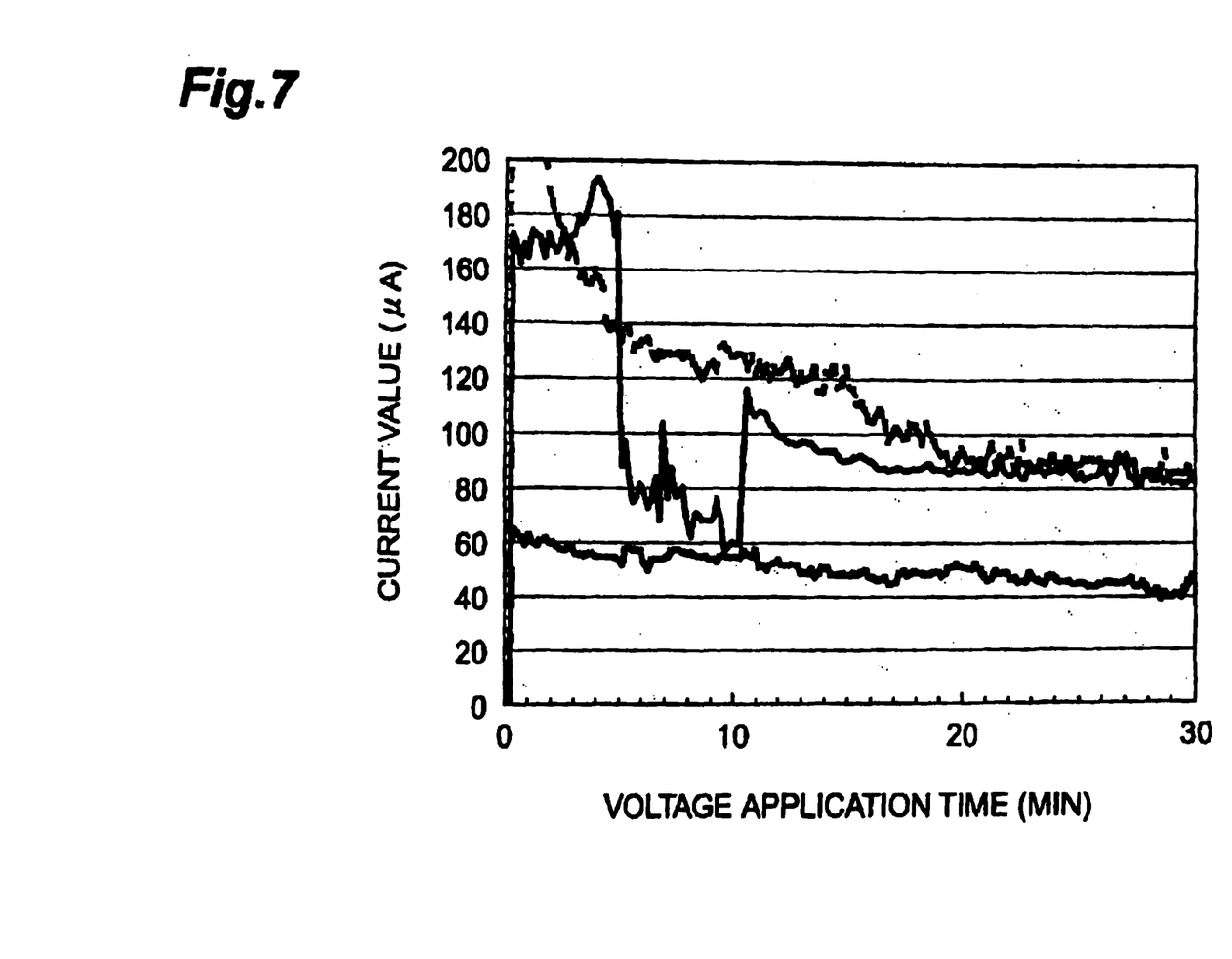
FIG. 7 is a graph showing change in leakage current value with respect to voltage application time after dielectric layer damage in the solid electrolytic capacitor of Comparative Example 1.
Figure 8:
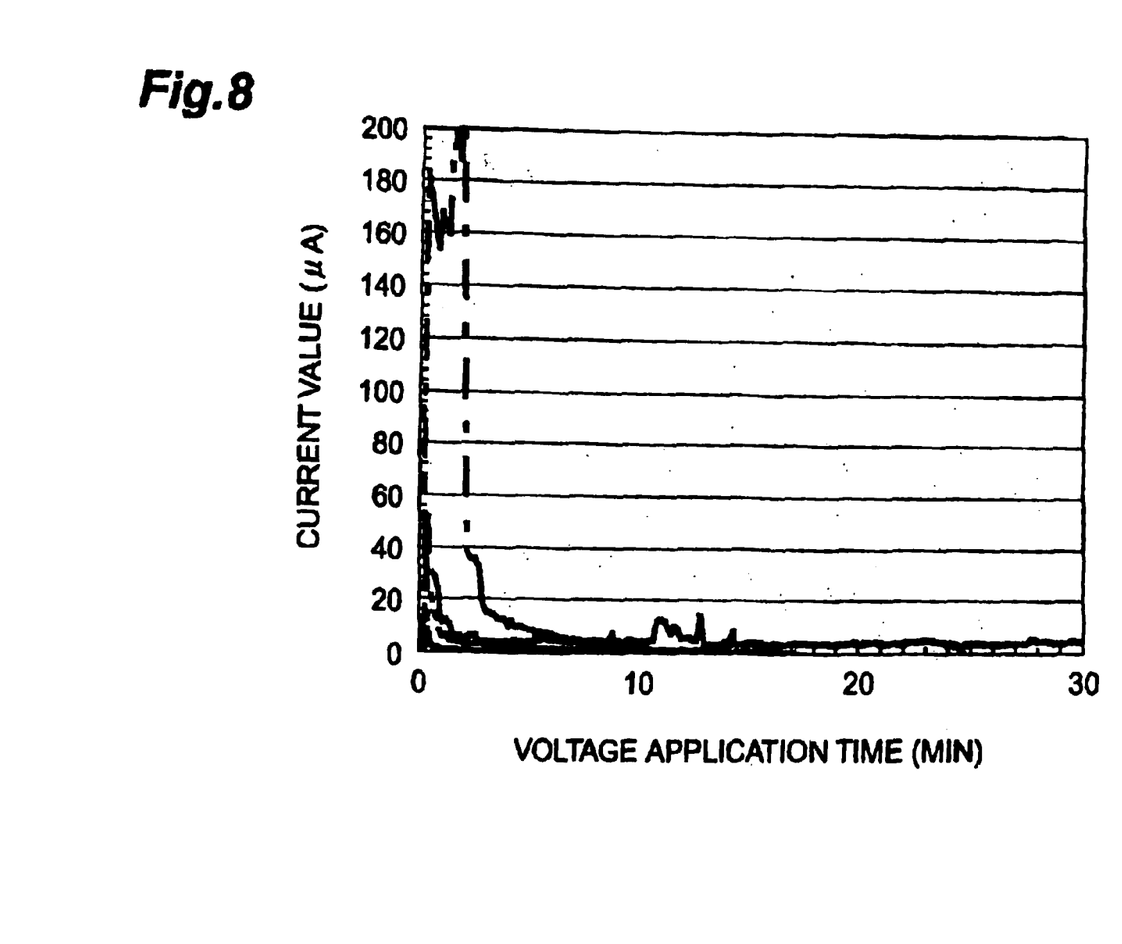
FIG. 8 is a graph showing change in leakage current value with respect to voltage application time after dielectric layer damage in the solid electrolytic capacitor of Example 1.

The solid electrolytic capacitors of Example 1 and Comparative Example 1 were each exposed to ultrasonic waves (120 Hz) applied for 30 seconds, and separately, to heat shock by a temperature variation from 180° C. to −5° C. repeated 5 times, to produce damage in the dielectric layer of the solid electrolytic capacitor. The leakage current value was then measured while applying a voltage of 14 V to each solid electrolytic capacitor. FIGS. 7 and 8 are graphs showing the results obtained for the solid electrolytic capacitors of Comparative Example 1 and Example 1. The graph curves in FIGS. 7 and 8 are the results obtained for multiple runs of each experiment.

FIG. 8 confirmed that the solid electrolytic capacitor 1 of the invention which contained Nafion in the solid electrolyte layer 20 exhibited a rapid reduction in the leakage current value with longer voltage application time. This indicated that solid electrolytic capacitors 1 exhibited an excellent repair function for the dielectric layer 4.

FIG. 7, in contrast, confirmed that the conventional solid electrolytic capacitor containing no Nafion in the solid electrolyte layer 20 exhibited only a small degree of reduction in the leakage current value with longer voltage application time, resulting in insufficient reduction of the leakage current value even after the course of half an hour. This indicated an inadequate self-repair function of the damage in dielectric layer.

As explained above, the solid electrolytic capacitor of the present invention can adequately prevent deterioration of devices with time while satisfactorily inhibiting insulation defects and short circuits between electrodes which result from damage to the dielectric layers. Moreover, the process for fabrication of a solid electrolytic capacitor of the invention allows very simple and efficient fabrication of solid electrolytic capacitors having such excellent properties.

What is claimed is:

1. A solid electrolytic capacitor comprising:
   a first electrode layer;
   a dielectric layer formed on said first electrode layer;
   a second electrode layer opposing to said first electrode layer; and
   a solid electrolyte layer disposed between said first electrode layer and said second electrode layer and adjacent to said dielectric layer, said solid electrolyte layer made of a solid electrolyte containing a conjugated polymer compound and a polymer compound having a proton-donating functional group.

2. A solid electrolytic capacitor according to claim 1, wherein said first electrode layer is a valve metal layer made of a valve metal consisting of aluminum, tantalum, niobium, titanium or zirconium.

3. A solid electrolytic capacitor according to claim 1, wherein said proton-donating functional group is a sulfonic acid group or phosphoric acid group.

4. A solid electrolytic capacitor according to claim 1, wherein the molecular frame to which said proton-donating functional group is bonded in said polymer compound contains a fluoroethylenic polymer, styrene polymer, (meth) acrylic polymer or imide polymer.

5. A solid electrolytic capacitor according to claim 1, wherein said polymer compound having a proton-donating functional group has a perfluoroalkyl ether side chain having a sulfonic acid group.

6. A solid electrolytic capacitor according to claim 1, wherein said conjugated polymer compound is polyaniline, polypyrrole, polythiophene, polyfuran or a derivative thereof.

7. A solid electrolytic capacitor according to claim 1, wherein said polymer compound having a proton-donating functional group is present at 0.01–50 parts by weight to 100 parts by weight of said conjugated polymer compound.

8. A process for fabrication of a solid electrolytic capacitor comprising the steps of:
   a first electrode layer forming step in which a surface of a valve metal is etched to form a first electrode layer;
   a dielectric layer forming step in which the etched section of said first electrode layer is oxidized to form a dielectric layer;
   a solid electrolyte layer forming step in which a monomer-containing composition, including a monomer for a conjugated polymer compound and a solution containing a polymer compound having a proton-donating functional group dissolved in a solvent, is supplied onto said dielectric layer, said monomer in said monomer-containing composition is polymerized, and said solvent is removed either during or after said polymerization in order to form a solid electrolyte layer;
   and a second electrode forming step in which a conductive member is laminated on said solid electrolyte layer to form a second electrode layer.

9. A process for fabrication of a solid electrolytic capacitor according to claim 8, wherein said second electrode layer forming step is followed by an additional post-treatment step of aging treatment.

* * * * *